April 24, 1962 A. E. MUELLER 3,030,744
AIR FILM BEARING FOR MACHINE TOOLS
Filed March 8, 1960
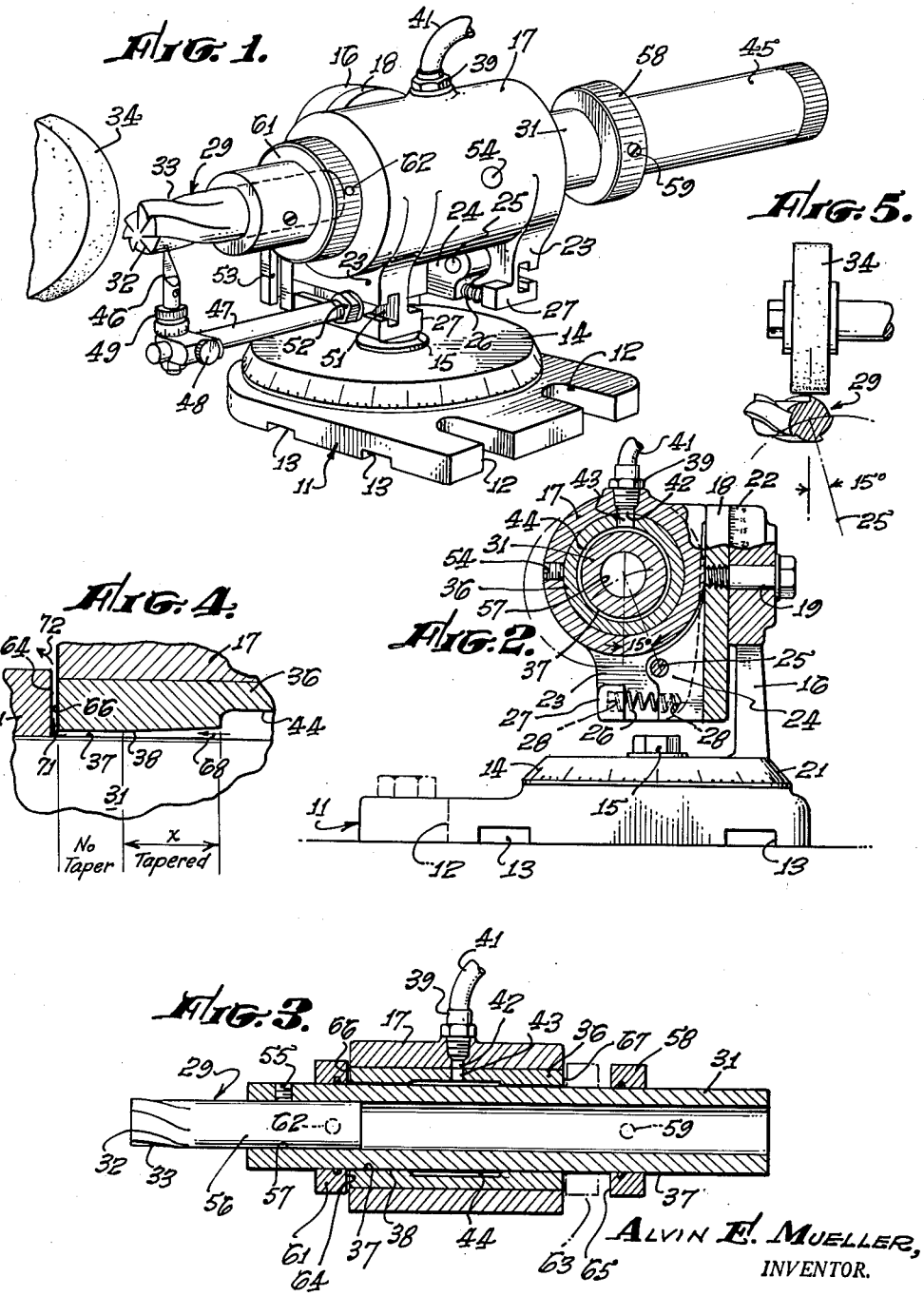
ALVIN E. MUELLER,
INVENTOR.
BY
Knight & Rodgers
ATTORNEYS

United States Patent Office 3,030,744
Patented Apr. 24, 1962

3,030,744
AIR FILM BEARING FOR MACHINE TOOLS
Alvin E. Mueller, Downey, Calif., assignor, by mesne assignments, to Harig Manufacturing Corporation, a corporation
Filed Mar. 8, 1960, Ser. No. 13,658
3 Claims. (Cl. 51—225)

The present invention relates generally to machine tool elements, but more especially it is concerned with an anti-friction bearing for supporting a shaft, spindle, or other member with a minimum resistance to rotational or sliding movement. This application is a continuation-in-part of my earlier application Serial No. 776,364, filed November 25, 1958 for "Tool Grinding Fixture," now abandoned.

As a specific example of my invention I show and describe it embodied in a grinder for sharpening drills, end mills, and the like in which the tool to be sharpened is held in a spindle supported for axial and rotational movement. In fixtures of this character the spindle is manipulated by hand. Because of the need for precise alignment of the axis of the spindle during movement, it fits as closely as possible in its bearing. This close fit has heretofore created such an amount of friction that the spindle and tool therein cannot be moved freely and easily. After being at rest for a short time the spindle usually freezes in the bearing and when moved it jumps, moving farther or with more force than desired. Likewise when moved slowly it has a jerky, uneven motion that prevents the operator from exercising the high degree of motion control desired in order to sharpen perfectly a tool in the fixture.

It is generally true in journal-type bearings that a relatively high degree of friction is encountered because of the large areas on the shaft and bearing which are in mutual engagement. While a satisfactory reduction in the friction encountered can often be obtained by such means as ball or roller bearings, there are circumstances under which it is desirable to use a journal-type bearing in which there is a very close fit between the shaft and the surrounding bearing, especially where precise alignment of the axis of the members must be maintained.

The general object of the invention is to provide a journal type bearing in which a rotatable shaft or similar element is mounted in a bearing sleeve for substantial freedom from friction opposing relative movement of the parts while at the same time being held by the sleeve to maintain exactly the alignment of the shaft axis.

A further object of the invention is to provide a bearing of this type in which a very close fit between the shaft and the surrounding sleeve or journal is maintained without excessive friction opposing rotational or axial movement of the shaft, thus avoiding any sticking or jerky movements even when the parts are moved by very small forces, as by manual manipulation.

It is also an object of the invention to provide a bearing of this type in which the rotating member may also be moved longitudinally relative to the bearing if desired; or either member may be moved axially of the other without rotational movement.

Devices have been proposed, such as described, for example in Patent No. 2,035,163 to Holmberg, for holding and guiding a tool having one or more spiral cutting edges, during sharpening thereof by a grinding wheel. In such an apparatus a tool holder is secured in a spindle mounted to permit manually controlled movement thereof both rotationally and axially. For the sake of maintaining as precise axial alignment of the tool as possible, tolerances in the spindle mounting are maintained as closely as can be done. The result has been a substantial degree of drag and interference with movement of the spindle after it has been resting in a fixed position.

Spindles of different sizes are required by such grinding devices for different sizes of tools to reduce as far as possible the jerky movement of the tool against the grinding surface and consequent breakage thereof or formation of poor and inaccurate cutting surfaces.

It is accordingly an object, in one form of the invention, to obtain results better than those obtainable with tool holders heretofore known, to enable more precise alignment of the axis to be provided, and to reduce friction and overcome "drag" in the movement in order to improve the "delicacy of feel."

More particularly, it is an object of this particular form of the invention to enable a wide range of tool sizes, including small diameter tools, to be sharpened with a single size of tool holding fixture without the risk of breaking by abrupt motion in relation to a grinding wheel or the supporting blade-rest over which the helical faces of the flutes pass.

Moreover, it is a specific object of the invention to enable the surface of a tool being ground to be moved along the grinding wheel surface while maintaining very delicate manual control of the position thereof.

Still another object of the invention is to impart a twisting movement to the tool being ground while guarding against abrupt movement, breakage thereof, and departure from an accurately maintained alignment of the axis of the tool.

A further object is, in general, to float a movable member in a fluid lubricating medium while sweeping the bearing surface to prevent the entry of foreign particles, thereby eliminating abrasion or locking of bearing surfaces by said particles.

Still another object is to permit special procedures such as generating radial relief behind the cutting edge of a tool by the "under the wheel" method.

A further object is to achieve reproducibility of results in the grinding or sharpening of succesive tools with a tool holding fixture.

These and other objects of my invention are attained in a machine element comprising two relatively movable members, for example a bearing sleeve and a shaft or similar member within the bearing and movable relative thereto. The sleeve fits closely around the shaft and has a portion of its inner bearing surface tapered relative to the shaft. The assembly is provided with means for introducing gas under pressure into the space between the sleeve and the shaft so that the gas flows over the surface of the shaft in axial directions, escaping at the ends of the sleeve. Such gas may be air but in some cases it may be preferred to use a gas having a higher density, for example carbon dioxide. The gas is preferably introduced into an annular distribution chamber extending around the shaft and typically cut or recessed into the sleeve.

Either one of the sleeve or the shaft may be stationary and the other one movable in the broad aspect of my invention; but the location of the tapered surface and the distribution chamber is preferably in the sleeve for practical reasons. That is the more usual arrangement since ordinarily the shaft is the rotatable member of the combination. When there is only relative rotation, the gas distribution chamber may be in either member. At either side of the distribution passage the bearing surface of the sleeve is tapered preferably at the rate between about .0005 to .0010 inch per longitudinal inch. Beyond each tapered section the sleeve may have a cylindrical surface, preferably not more than about $\frac{1}{16}$" in length or even less, and having a relatively small clearance between it and the shaft. This clearance is preferably of the order of .00015–.00045 inch.

The term clearance as used herein refers to total clearance which is the difference between the inside diameter of the sleeve and the outside diameter of the shaft.

In a preferred form of the invention embodied in a grinder for sharpening end mills and fluted drills, a fixture is provided having a base adapted to be bolted to the bed plate of a lathe or tool grinder. For supporting a tool to be sharpened a bar or spindle is provided which may be manually moved axially and rotated in a bearing sleeve with a suitable motion to move the cutting edges of a fluted tool spirally along a grinding wheel surface. For setting the axis along which the spindle and the tool are moved, the bearing is secured to the base by a mounting providing adjustment about two mutually perpendicular axes. For maintaining alignment of the axis of the tool very precisely the spindle and sleeve have polished surfaces and a very close fit, so close that a liquid lubricant or grease cannot be used and even an unlubricated bearing tends to drag or seize to an extent that a light steady movement of the spindle controlled by the feel of the operator's fingers cannot be achieved using such a bearing without lubrication.

In order to float the closely fitting spindle in the bearing and substantially eliminate friction, a gaseous medium is used as a lubricant and pumped into the interior of the bearing under pressure. The gas flows axially between the shaft and the sleeve bearing surfaces. The fit is so close that even with the air under considerable pressure very little leaks from the ends of the bearing. Nevertheless the bearing surfaces are scavenged of grinding dust and other particles which could wear the bearing to inaccurate dimensions and the friction is reduced so low that very delicate manual control of the spindle position is achieved.

A better understanding of the invention will be afforded by the following detailed description considered in conjunction with the accompanying drawing in which:

FIG. 1 is a perspective view of a specific embodiment of the invention in a grinding fixture;

FIG. 2 is an end view thereof, partially in cross-section;

FIG. 3 is a fragmentary longitudinal sectional view of the spindle and its bearing;

FIG. 4 is an enlarged fragmentary longitudinal sectional view of a portion of the bearing shown in FIG. 3 in order to show the path of lubricant in a combined sleeve and thrust bearing;

FIG. 5 is a diagram illustrating the manner of rocking the improved fixture to facilitate escape of the tool from under the grinding wheel after sharpening is completed, when using the "under the wheel" method of sharpening.

In the grinding fixture illustrated in the drawings as a specific form of the invention, there is a base 11 adapted to be bolted to the bed plate of a lathe or a tool grinder, or the like, by suitable bolts, not shown, adapted to engage slots 12. If desired, guide slots 13 may also be provided on the lower surface of the base 11 to facilitate alignment and longitudinal adjustment of the base 11 on the bed plate of the machine with which it is used. For the sake of enabling the device to be set in any desired angular position with respect to two mutually perpendicular axes, a turntable 14 is mounted on the base 11 with a vertical axis of rotation, secured thereto by suitable means, such as a machine screw 15, and carrying a goose-neck bracket 16 on which housing 17 for a bushing or spindle bearing is in turn mounted with a horizontal axis of rotation with respect to the bracket 16.

In the arrangement shown an intermediate plate 18 is provided for carrying the housing 17, and plate 18 is rotatably secured to the bracket 16 by suitable means, such as a machine screw 19. In order to provide indications of the angular positions in which the turntable 14 and the plate 18 are secured, the edge of table 14 is provided with suitable graduations in a scale 21 and bracket 16 is likewise provided with suitable graduations in a scale 22, marked on a cylindrical edge of bracket 16. It will be understood that scales 21 and 22 cooperate with suitable indices, not illustrated.

Instead of securing housing 17 rigidly to its mounting plate 18, it is so mounted as to permit a rocking motion through a small angle when it is desired to back off the fixture after grinding a cutting edge, by the "under the wheel" or other method, to avoid drawing the ground edges of the tool along the grinding surface after grinding has been completed. To this end the housing 17 is provided with depending projections or ears 23 and the plate 18 is formed with wings 24 to which the ears 23 are pivoted by two pins 25. While the cutting edge is being ground, housing 17 is held firmly against plate 18; and for this purpose suitable means, such as strong helical compression springs 26 are provided. The ears 23 are formed with lugs 27 and both the lugs 27 and the wings 24 are provided with sockets 28 to receive the ends of the biasing springs 26.

For movably supporting a tool 29 to be sharpened, a shaft or spindle 31 is provided which is carried in housing 17 so as to be rotatable therein and normally also free to move axially in order that either end cutting surfaces 32 or lateral spiral cutting edges 33 on the tool may be caused to transverse the grinding surface of a grinding wheel 34. Preferably, as shown, the bearing assembly for the spindle is in the form of a sleeve 36 inside housing 17 having the actual bearing engaging the shaft or spindle 31. The outer surface 37 of the spindle 31 and the inner surface 38 of the sleeve 36 are highly polished in order to permit a smooth fit. The fit is made very close in order that the alignment of the axis of the spindle and tool may be maintained very accurately for the purpose of enabling the cutting edges 32 and 33 to be ground very accurately in relation to the axis of the tool 29.

It will be understood that the specific embodiment of the present invention described above is typical but not necessarily limitative upon the invention. Various other arrangements are possible within the scope of my invention. For example, the central shaft may be stationary. The bearing sleeve may then revolve about the shaft as an axle. Alternatively, the sleeve may be restrained against rotational movement and be adapted only to linear movement along the shaft.

When, as here, the shaft is a rotating member it has a cylindrical external surface in order that the section within the bearing is always of uniform diameter even though the shaft is shifted axially relative to the bearing. Sleeve 36 has an internal bearing surface that supports shaft 17. Actually this bearing surface is divided into two surfaces 38 that extend inwardly from each end of the sleeve and are separated by recess 44 at which the bearing surface is out of bearing engagement with the shaft.

As shown in FIG. 4, each bearing surface 38 has a major portion tapered with the smallest internal diameter at or close to the end of the bearing sleeve. While the taper may extend to the extreme end of the sleeve, it is preferred that the bearing surface terminate outwardly of the sleeve in a narrow cylindrical surface indicated in FIG. 4 as a section of no taper. This is best made narrow, no more than 1/16 inch measured axially of the sleeve. Wider cylindrical surfaces are theoretically satisfactory; but for practical reasons a very short cylindrical surface is preferred and is adequate. The total clearance between the sleeve and shaft at this point of minimum internal diameter of the sleeve is preferably of the order of .00015–.00045 inch for a typical spindle having a diameter of about 1½ inch. The preferred rate of taper is about .0005–.0010 in./in. of axial length, the diameter increasing inwardly from the ends of the bearing. Assuming a typical length of surface 38 of two inches, the maximum internal diameter is only about .001–.002 inch greater than the minimum. Pratically, a taper up to .0025 in./in. is operable and this is a desirable maximum under other conditions herein mentioned. These small dimensions cannot be shown accurately in FIG. 4 and so have been greatly exaggerated.

In order to avoid seizing or drag between adjacent steel surfaces of sleeve 36 and spindle 31, a suitable gaseous lubricant such as air under pressure is introduced into the bearing. Other gases, as $CO_2$ or nitrogen, may be used. Air is introduced near the midpoint of the bearing by means of a fitting 39 connected to a conventional compressed air line 41. To admit this gas, registering apertures 42 and 43 are provided in housing 17 and sleeve 36. The inner surface of sleeve 36 is recessed centrally to form an annular gas distribution passageway 44. The gaseous lubricant is introduced into the line 41 under sufficient pressure to "float" the spindle 31 in the bushing. Annular recess 44 serves as a gas-distribution passage and distributes the gas evenly around the entire circumference of shaft 31 and also to be distributed evenly to the two bearing surfaces 38 which are located one at either side of recess 44. Since the clearance between the bearing surfaces on the shaft and the bearing sleeve is a maximum adjoining recess 44, the gas entering the bearing does so at the point of maximum clearance between these two members. The gas then flows axially along the shaft 31 in the space between the shaft and the sleeve and is exhausted to the atmosphere at the ends of sleeve 36.

The gas flowing between the bearing surfaces on the shaft and sleeve provides a thin film which acts as a lubricant between these two bearing surfaces and reduces friction to a very low value. It has been found that the gas should be introduced at a pressure in excess of some minimum pressure depending upon the unit load between the bearing surfaces. In the case of a spindle having a diameter of about 1½ in. or a circumference of about 5 inches, it has been found that at a pressure of about 25 pounds per square inch the sliding spindle 31 begins to float. Increased gas pressure increases the freedom of motion until at about 60 to 75 pounds per square inch a supersensitive feel is created which enables the operator to accomplish his grinding operations with manual movement of the tool along the surface of grinding wheel 34 by grasping handle 45 at the opposite end of bar 31 from tool 29. In the range of approximately 50 to 100 pounds per square inch, the feel is so sensitive that even with a large sliding bar 31 the operator can sharpen an end mill of miniature size with complete freedom from friction and stickiness. Under these pressures and with the clearances mentioned above, the total volume of gas passing through the bearing is only about 1.5 to 4.5 cubic feet per hour, or on the average about .01 cubic ft. per minute per inch of circumference of the shaft.

The bearing surfaces are highly polished in order to obtain the minimum friction. They are kept dry, eliminating the need for any lubricant other than the film of gas. The gas sweeping outwardly through the bearing carries with it any minute particles of foreign matter which might otherwise abraid the bearing surface. The gas flow at the ends of the bearing is in a direction to blow away any particles of abrasive material which might otherwise enter the bearing at the ends.

In this manner the problem of drag or insensitive feel is overcome, which would otherwise occur with clearances of the order of .0003 in. to .0006 in., even with the use of dissimilar metals instead of steel for the bushing and the bar. Nevertheless, minimum clearances are desirable in fixtures which depend entirely upon clearances in the bearing to achieve accurate work of the type demanded in modern industry. The magnitude of such minute clearances depends on the character of the surface finish and also, to some extent, on the diameter of the bearing. It has been found, however, that the gas cushion principle increases the precision of alignment as well as providing a film of air or other gas that seems to float or suspend the spindle in the bearing. As a consequence it is extremely sensitive to the touch and permits very accurate grinding of tools.

Under some conditions it may be desired to use some other gas than air, for example carbon dioxide. This gas has several advantages. It is comparatively inert, and therefore there is less tendency for oxidation of the bearing surfaces. Also, commercial grades of compressed carbon dioxide generally have less moisture in them than is found in compressed air unless unusual precautions are taken; and it is of definite advantage to keep the bearing surfaces as dry as possible. Carbon dioxide has a density approximately 1.45 times that of air; and apparently this physical property of the gas makes it possible to obtain the same results at a lower unit pressure of the gas than is the case with air. For example in one shaft in which a minimum pressure of 30 p.s.i. was required to establish a lubricating film of air it was found that the same degree of freedom of movement, or removal of friction, could be obtained when carbon dioxide was supplied at only 20 p.s.i.

In order to facilitate guiding the tool, especially one with fluted cutting edges 33 to be sharpened, a guide finger (or support rest) 46 is provided. For supporting the guide finger 46 an arm 47 is provided on which the finger and its support assembly are slidably mounted. Axial adjustment along the arm 47 is permitted by loosening conventional thumb nut 48. Rotary adjustment of the guide finger 46 as well as movement toward and away from tool 29 is permitted by loosening and then tightening knurled lock nut 49. This assembly, may be similar to that shown in Holmberg Patent No. 2,035,163, and need not be described or illustrated in further detail, since it does not constitute a part of the present invention. Transverse adjustment of the position of the guide finger arm 47 can also be accomplished with a conventional T-slot keyway 51 and a lock nut 52. In accordance with the present invention, however, a vertical T-slot keyway 53 is also provided for mounting the assembly of the guide finger 46 and the supporting arm 47 when it is desired to employ the "under the wheel" method of sharpening, such as is represented diagrammatically in FIG. 5.

As shown, a set screw 55 is provided for securing the shank 56 of the tool 29 in a tool receiving socket or recess 57 formed in the end of the bar 31. Alternatively a chuck with movable jaws may be used as long as it provides sufficiently accurate alignment.

For supporting smaller tools in the bar 31, suitable sleeves of the proper internal diameter and with external diameter to fit the socket 57 are provided. Preferably also a collar 58 is secured to the handle end of spindle 31 by means of set screw 59 in order to provide a limit stop for axial movement of the spindle 31. For certain types of grinding, such as taper grinding, for example, of an end mill, collars may be provided on the spindle 31 at either end of the housing 17. For example, a second collar 61, secured by set screw 62, may be provided, in which case the collar 58 is brought into close clearance with the end of housing 17, in the position 63a represented by dotted lines. It will be understood that the inner surfaces 64 and 65 of the collars 58 and 61 for this type of operation of the device are ground to a smooth, polished surface, perpendicular to the axis of the spindle 31 and that likewise the end surfaces 66 and 67 of the bearing 17 are also ground or polished to a smooth surface perpendicular to the spindle axis.

The gas leaks through the clearance between the bearing surface 38 and the spindle surface 37, traveling in the direction of arrows 68 in FIG. 4. When both collars 61 and 58 are employed for preventing axial movement of the spindle 31, there is a close fit also between the end surfaces such as at 64 and 66, as illustrated in FIG. 4, to form a cushion thrust bearing; and the air, after traveling axially in the direction of the arrows 68, turns in the direction of the arrow 71 and travels radially outward, escaping as indicated by arrow 72, in FIG. 4. Thus a completely cushioned sleeve and thrust bearing is provided, which is floated by the gaseous lubricant, such as air in the example illustrated, and a very delicate feel is accomplished as a result of the negligible friction.

The gas under pressure can be provided from portable storage tanks, or by a portable compressor, or by a large central stationary compressor, such as is found commonly in metal working plants. For the sake of simplicity in the drawing, the fitting 39 for connecting the air supply has been shown on the top side of the bearing 17. Optionally, a connection may be made beneath the bearing if working conditions permit. With the air hose in its entirety extending downward from the fixture, moisture and impurities may be inhibited from entering the bushing. Ordinary connections commonly used in machine shops may be used to attach the air hose to the bushing.

The apparatus may be used not only for grinding the periphery of straight diameter end mills but also, by employing both collars 58 and 61 to prevent endwise or axial movement, for sharpening angular or tapered end mills. In this use, the apparatus is a supersensitive workhead and the fixture may be swung horizontally to any angle to sharpen such angular or tapered end mills by passing over a guide finger suspended next to the grinding wheel and using table travel of the grinding machine combined with the rotary motion of the bar controlled by the handle 45. Thus the sensitivity heretofore unobtainable has made it possible to grind tapered end mills. Such sensitivity is achieved that only a single size of bearing is required for grinding very fine end mills as small as .03 in. diameter and up to 2 in. diameter, for example. A smaller spindle 31 may be preferred when working exclusively with small diameter drills or mills.

Although the invention is not limited to the precise arrangement illustrated, it has been found that satisfactory results are accomplished by providing an angle of about 15° between the perpendicular and a line passing through the spindle axis and the axis of the rocking pivot pin 25. This 15° angular offset between the work axis and the pivot axis for rocking motion facilitates safe escape from under the grinding wheel when the tool 29 is traversed under the peripheral edge of the grinding wheel 34, as illustrated in the diagram of FIG. 5. This makes possible the technique of generating radial relief behind the cutting edge by the "under the wheel" method. Moreover, it provides a very simple method of resharpening such tools with radial relief and has the further advantage of attaining grinding marks which are parallel to the cutting edge instead of perpendicular to it. Tests have shown that such parallel grinding marks produce a cutting edge which cuts to a better surface finish and does not "pick up" metal, while cutting, nearly as much as a cutting edge with marks behind it that are perpendicular to it so as to form a saw-tooth edge as seen under a magnifying glass.

Various changes in the specific design and arrangement of parts may be made within the broad spirit and scope of my invention. For example, I have shown the axis of shaft 31 as horizontal in the drawing but it can as well be vertical, as in the case of a spindle for a drill press or similar machine tool. When shaft 31 is vertical the weight of the shaft may be taken by collar 58 or other similar member; and the gas escaping at the upper end of the bearing then acts as a gas film between the collar and the bearing, as already described.

For obvious reasons, it is preferred to connect gas supply line 30 to a stationary member and accordingly in the construction of FIG. 1 this line has been connected to housing 17 and sleeve 36. In the event that it is desired to rotate the sleeve around a fixed shaft, the gas supply line may be connected to the shaft for introduction of gas to the bearing surfaces.

While the invention has been described as embodied in concrete form and as operating in a specific manner in accordance with the provisions of the patent statutes, it should be understood that the invention is not limited thereto since various modifications will suggest themselves to those skilled in the art without departing from the spirit of the invention, the scope of which is set forth in the annexed claims. For example, the inner diameter of the sleeve may be varied at a uniform rate producing a straight line profile, or at a non-uniform rate producing a curved profile. Obviously the former is more practical to make to close tolerances and therefore is preferred. When the shaft or sleeve rotates relative to the other, the bearing surfaces are circular in cross-section. If no rotation is desired but only movement longitudinal of the shaft, the bearing surfaces may be non-circular in cross section. Of course the bearing surfaces on the sleeve and shaft should be of the same shape in order that the gap between them can be uniform around the entire periphery of the shaft. With this in mind it is desired that the term "diameter" as used herein be construed broadly enough to apply to non-circular shapes of the bearing surfaces.

I claim:

1. A bearing construction comprising an elongated sleeve, an elongated shaft of substantially uniform diameter throughout its length mounted in said sleeve for rotation relative thereto and closely fitting within said sleeve and movable axially with respect to said sleeve, said sleeve having formed in its inner surface midway between the opposite ends thereof a circumferentially extending gas-receiving recess opening upon said shaft, the inner circumferential surface of the sleeve adjacent the ends of said recess tapered at a substantially uniform rate outwardly from the recess toward the ends of the sleeve to provide circumferentially disposed restrictive passages at opposite ends of said sleeve to retard the passage of gas from the recess thereby to suspend the shaft axially within said sleeve by such retarded gas, said taper terminating short of the opposite ends of said sleeve, and means communicating with said recess at a point midway between the ends thereof to deliver gas to said recess for distribution thereby in opposite directions longitudinally and circumferentially of said shaft.

2. A tool grinding fixture comprising a base,
a housing adjustably carried by the base,
an elongated sleeve fixedly mounted in said housing,
an elongated shaft of substantially uniform diameter throughout its length mounted in said sleeve for rotation relative thereto and closely fitting within said sleeve and movable axially with respect thereto,
means for supporting a tool at one end portion of said shaft for movement therewith,
said sleeve having formed in its inner surface midway between the opposite ends thereof a circumferentially extending gas-receiving recess opening upon said shaft,
the inner circumferential surface of the sleeve adjacent the ends of said recess tapered at a substantially uniform rate outwardly from the recess toward the ends of the sleeve to provide circumferentially disposed restrictive passages at opposite ends of said sleeve to retard the escape of gas from the recess thereby to suspend the shaft axially within said sleeve by such retarded gas,
said taper terminating short of the opposite ends of said sleeve,
and means communicating with said recess at a point midway between the ends thereof to deliver gas to said recess for distribution thereby in opposite directions longitudinally and circumferentially of said shaft.

3. A tool grinding fixture comprising a base,
a housing carried by said base,
an elongated sleeve fixedly mounted in said housing,
an elongated shaft of substantially uniform diameter throughout its length mounted in said sleeve for rotation relative thereto and closely fitting within said sleeve and movable axially with respect thereto, means for supporting a tool at one end portion of said shaft for movement therewith, said sleeve having formed in its inner surface midway between the opposite ends thereof a circumferentially extending gas-receiving recess opening upon said shaft, the inner diameter of said sleeve adjacent the ends of said recess being slightly greater than the inner diameter of said sleeve at the outer end portions thereof to provide circumferentially disposed tapered restrictive passages at opposite ends of the sleeve to retard the escape of gas from the recess thereby to suspend the shaft axially within said sleeve by such retarded gas, and means communicating with said recess to deliver gas to said recess for distribution thereby in opposite directions longitudinally and circumferentially of said shaft to interpose a film of gas between said shaft and said sleeve.

References Cited in the file of this patent

UNITED STATES PATENTS

| | | |
|---|---|---|
| 2,035,163 | Holmberg | Mar. 24, 1936 |
| 2,645,534 | Becker | July 14, 1953 |
| 2,671,700 | Seyffert | Mar. 9, 1954 |
| 2,683,635 | Wilcox | July 13, 1954 |

FOREIGN PATENTS

| | | |
|---|---|---|
| 129,424 | Great Britain | July 8, 1919 |
| 463,635 | Canada | Mar. 14, 1950 |
| 529,806 | France | Sept. 16, 1921 |
| 645,881 | Great Britain | Nov. 8, 1950 |